United States Patent [19]

Hazelsky

[11] Patent Number: 4,474,347
[45] Date of Patent: Oct. 2, 1984

[54] CRASHWORTHY SEAT

[75] Inventor: Bernard Hazelsky, West Covina, Calif.

[73] Assignee: ARA, Inc., City of Industry, Calif.

[21] Appl. No.: 378,312

[22] Filed: May 14, 1982

Related U.S. Application Data

[63] Continuation of Ser. No. 100,563, Dec. 5, 1979, abandoned, which is a continuation of Ser. No. 28,123, Apr. 9, 1979, abandoned, which is a continuation of Ser. No. 858,957, Dec. 9, 1977, abandoned.

[51] Int. Cl.³ ............................................. B64D 25/04
[52] U.S. Cl. ........................... 244/122 R; 244/122 B; 244/122 AG; 188/371; 297/216
[58] Field of Search ........ 244/122 R, 122 B, 122 AG; 188/371, 372; 297/216

[56] References Cited

U.S. PATENT DOCUMENTS

| | | | |
|---|---|---|---|
| 3,301,351 | 1/1967 | Platus et al. | 188/372 |
| 3,314,720 | 4/1967 | Millington et al. | 244/122 AG |
| 3,561,690 | 2/1971 | Muskat | 188/372 |
| 3,868,143 | 2/1975 | Reilly | 297/216 |
| 3,922,034 | 11/1975 | Eggert | 297/216 |
| 4,150,805 | 4/1979 | Mazelsky | 244/122 R |

OTHER PUBLICATIONS

Reilly, "Crashworthy Troop Seat Investigation", USAAMRDL TR-74-93, Dec. 1974, pp. 53, 54, 119-166 and 180.

Primary Examiner—Trygve M. Blix
Assistant Examiner—Ivy M. Shum
Attorney, Agent, or Firm—Herzig, Schaap & Yanny

[57] ABSTRACT

A crashworthy vehicle seat comprises a seat bucket member suspended by supporting webs engaged with rotary energy absorbers attached to the overhead of the vehicle. Beneath the seat bucket member, pairs of extensible and compressible energy absorbers are attached between the seat bucket member and the floor of the vehicle. Upon impact, the rotary energy absorbers and the extensible and compressible energy absorbers are arrayed to permit controlled and energy absorbing movement to reduce the probability of injury to the occupant of the seat. In the one form of the seat it accommodates itself to fore and aft forces acting upon it. In a modified form of the seat the design is optimized to accommodate these forces. In further forms of the seat the design is arranged for a sideward or lateral facing seat and the design is optimized to accommodate lateral forces.

4 Claims, 16 Drawing Figures

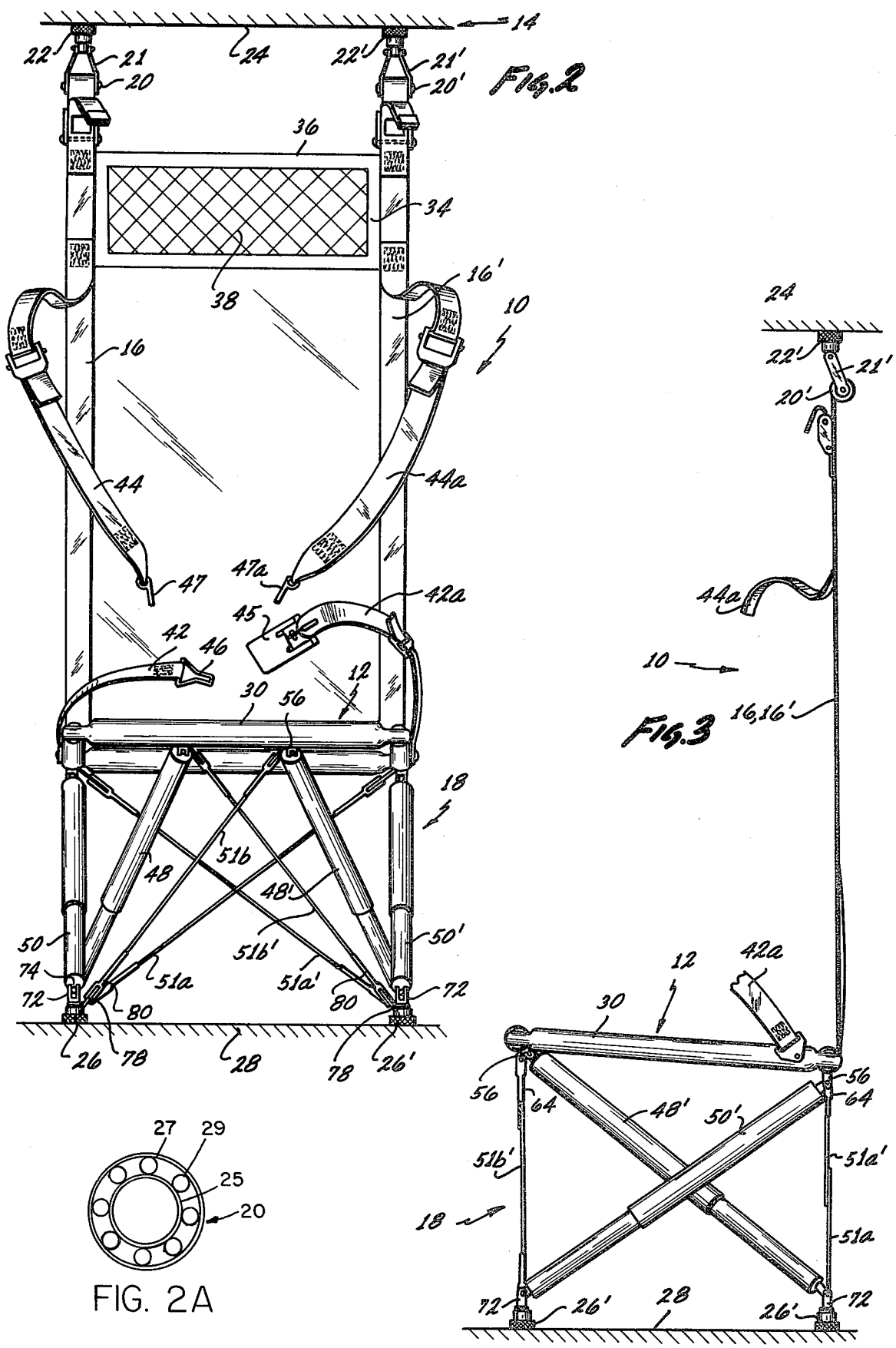

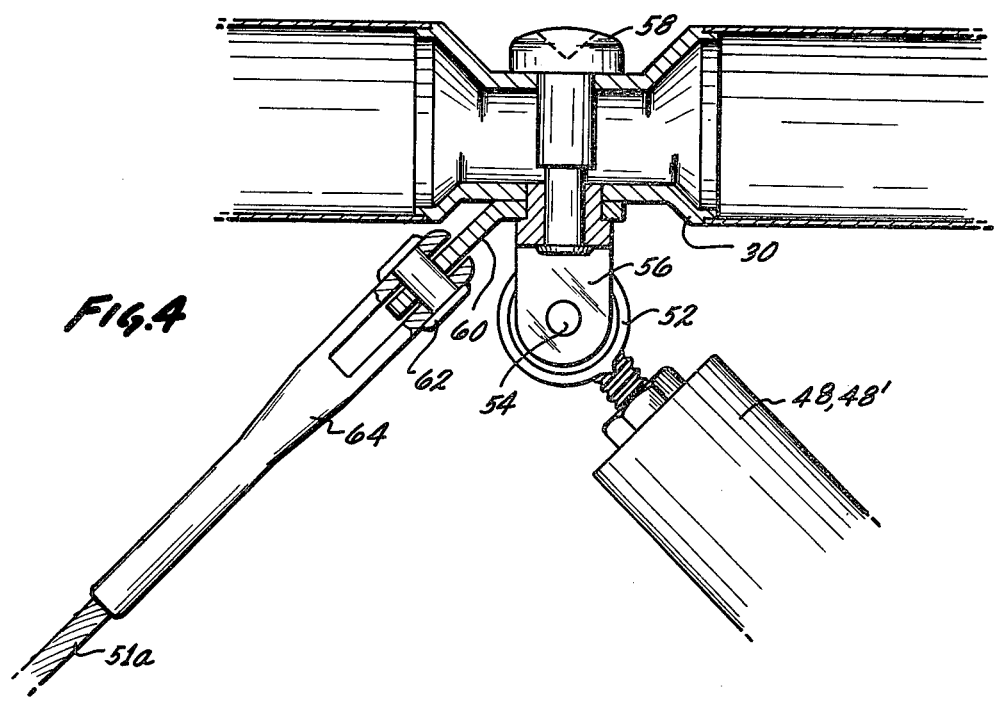
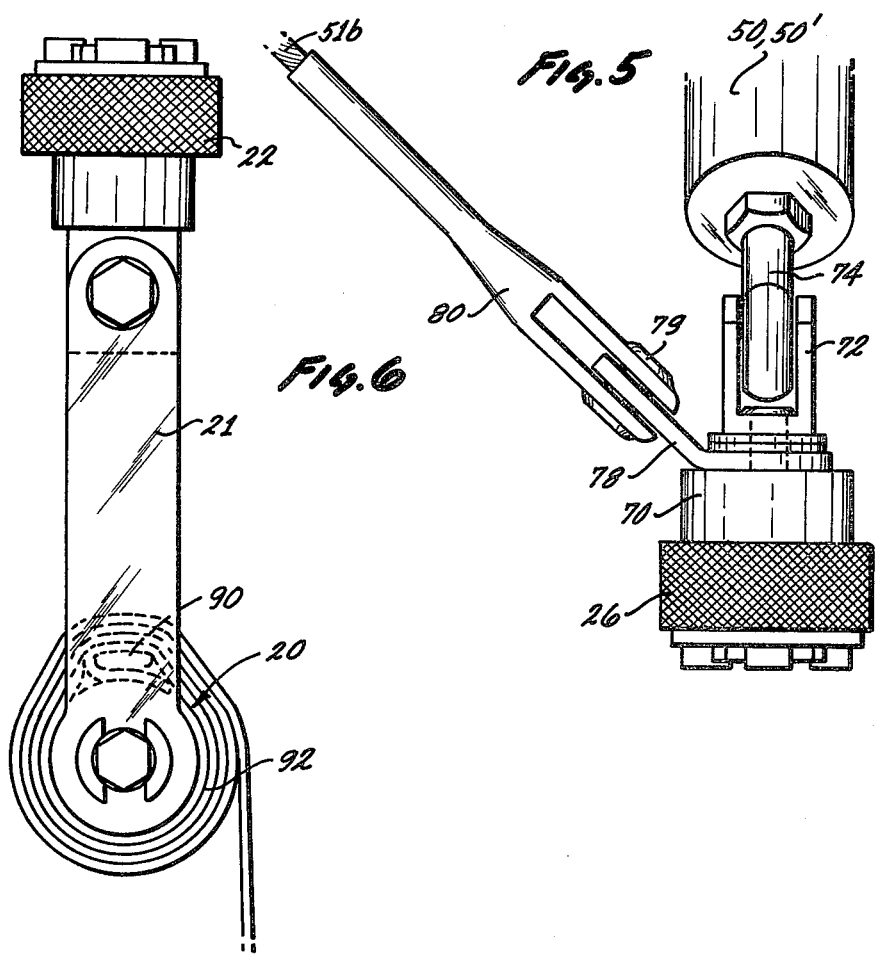

CRASHWORTHY SEAT

CROSS-REFERENCE TO RELATED PATENTS

Applicant hereby incorporates by reference the subject matter disclosed in U.S. Pat. No. 3,369,634 (to Applicant) and U.S. Pat. Nos. 3,301,351 and 3,231,049.

This is a continuation of Ser. No. 100,563 filed Dec. 5, 1979, now abandoned which is a continuation of Ser. No. 28,123 filed Apr. 9, 1979, now abandoned, which in turn was a continuation of Ser. No. 858,957 filed Dec. 9, 1977, now abandoned.

BACKGROUND OF THE INVENTION

1. Field of the Invention

The invention relates to crashworthy seats for use in vehicles, particularly aircraft.

2. Description of the Prior Art

With the recent sharp increase in utilization of high-speed vehicles, particularly aircraft, a substantial increase in demand for crashworthy seats for use in such aircraft has concurrently been experienced. Existing systems range from a simple soft seat structure to complex restraint systems, such as shoulder harnesses and the like.

Existing systems exhibit various disadvantages, such as complexity, expense and low cost-effectiveness.

Therefore, there has been a felt but unfulfilled need for a crashworthy seat for use in vehicles which is of relatively uncomplicated configuration and having favorable cost-effectiveness.

SUMMARY OF THE INVENTION

A crashworthy seat for use in vehicles comprises a seat bucket member, suspension means attached to the seat bucket member, first energy absorbing means attached between the suspension means and the overhead of said vehicle, and second energy absorbing means attached between the seat bucket member and the floor of said vehicle, the first energy absorbing means and the second energy absorbing means cooperating to permit arbitrary translational and rotational displacement of said seat for arbitrary crash orientations of said vehicle and absorbing energy in conjunction therewith.

BRIEF DESCRIPTION OF THE DRAWINGS

FIG. 2 comprises a perspective view of a crashworthy seat in accordance with the invention, viewed from the front thereof;

FIG. 2A is a view of one of the rotary energy absorbers;

FIG. 3 comprises a side elevation view of the crashworthy seat of FIG. 2;

FIG. 4 comprises a fragmentary view of a portion of the seat of FIG. 2;

FIG. 5 comprises a fragmentary view of another portion of the seat of FIG. 2;

FIG. 6 comprises a fragmentary view of yet another portion of the crashworthy seat of FIG. 2;

DETAILED DESCRIPTION OF THE PREFERRED EMBODIMENT

Figure 1:
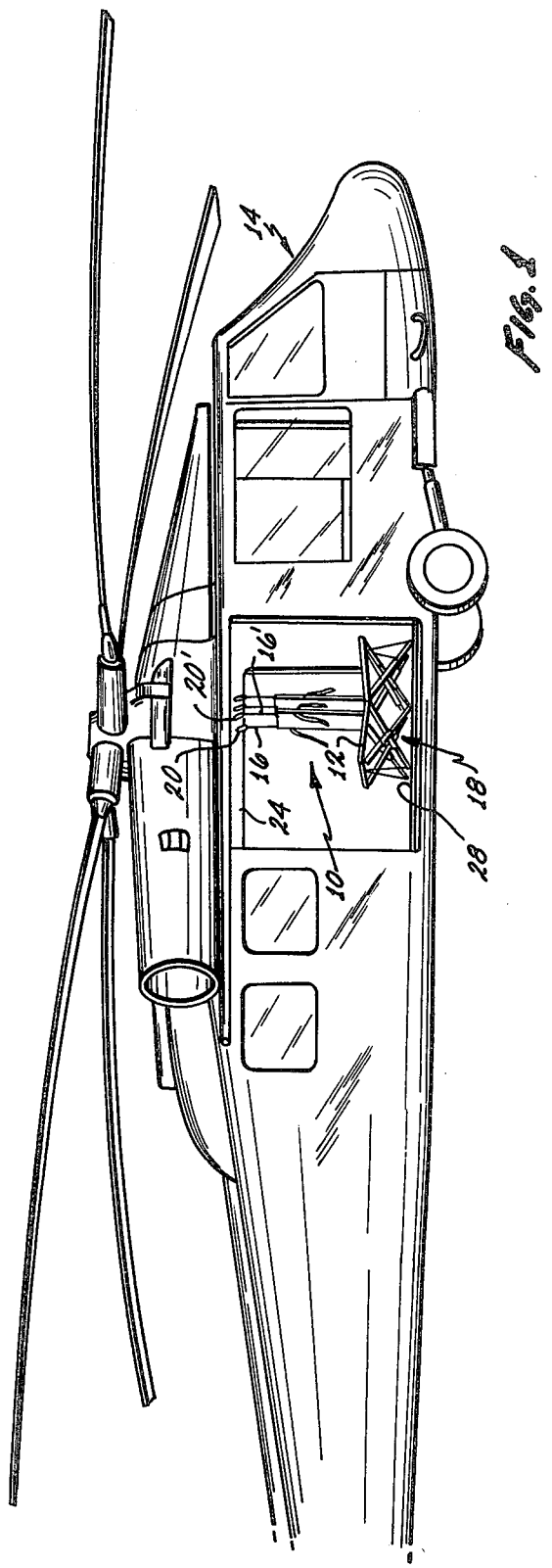
FIG. 1 comprises a perspective view of a crashworthy seat in accordance with the invention, mounted within a helicopter.

As best seen in FIGS. 1 and 2, a crashworthy seat 10 includes a seat bucket member 12. The seat 10 is depicted as being within a helicopter 14. Attached to the seat bucket member 12 are suspension means in the form of flexible webs 16-16'. Seat 10 further includes support means 18 disposed beneath the seat bucket member 12.

Webs 16 are engaged with a pair of rotary energy absorbers 20-20'. Energy absorbers 20 are fully disclosed in the above-referred U.S. Pat. No. 3,301,351 and will be described only briefly herein. The energy absorbers 20 are each pivotally attached to brackets 21-21' to fasteners 22-22' affixed to the overhead 24 of the helicopter 14. Engagement of the webs 16 with the energy absorgers 20 is described in more detail below. Support means 18 are attached between the seat bucket member 12 and fasteners 26-26' affixed to the floor 28 of the vehicle.

FIG. 2A illustrates one of the energy absorbers 20. It comprises a pair of concentric drums 25 and 27 which are adapted to rotate relative to each other and drive a series of tubular working elements 29. The tubular elements 29 may be made of various materials and are compressed laterally in the annular region between the drums in a predetermined amount so that they are deformed into the predetermined plastic strain range, as described more in detail in U.S. Pat. No. 3,301,351.

The seat bucket member 12 comprises a tubular frame 30 of generally square shape. Fabric (not shown) composed of such material as heavy cotton or synthetic suitable for heavy-duty use or other suitable material, is affixed to the seat frame 30 to form seat bucket 12. A piece of elastic material (not shown) may be attached to webs 16 immediately behind the small of the back of the user of the seat to accommodate a backpack or the like. A piece of fabric 34 is attached to an upper portion of webs 16 and includes a quilted portion 36 to form a headrest 38. A pair of lower straps 42, 42a are attached to frame 30 at the seat bucket member 12. A pair of upper straps 44-44a are attached to upper portions of webs 16. Lower strap 42a includes a lock member 45 with which a locking element 46 on strap 42 is lockably engageable to form a lap restraint. Locking elements 47-47a on straps 44, 44a are simularly engageable with locking member 45 to form shoulder restraints.

As best seen in FIGS. 2-6, support means 18 includes energy absorbing means comprising at least two pairs 48-48' and 50-50' of energy absorbing elements and two pairs of stiffener cables 51a-51a' and 51b and 51b'. Energy absorbing elements 48, 50 are of the type fully disclosed in the above-referred U.S. Pat. No. 3,369,634 and are only briefly described herein. A first pair 48-48' of energy absorbing elements are substantially symmetrically disposed beneath seat member 12 and are attached at their forward ends to the seat frame portion 30. Each energy absorber element 48 extends diagonally and rearwardly to attach to fasteners 26-26' disposed at the rear of the seat 10.

As best seen in FIG. 4, shock absorber element 48 includes a fitting 52 pivotally engaged with a pin 54 in a clevis 56 attached by a bold 58 to frame portion 30. Attached to the clevis 56 is a fitting 60 engaging pivotably with a pin 62 affixed to a clevis 64, a cable 51a being attached to the latter. Cable 51b extends diagonally from fitting 60 and is attached to a fastener 26 at the forward end of the seat 10. Cables 51a are substantially symmetrically disposed with respect to one another and contribute to lateral stiffening for the seat 10.

As best seen in FIGS. 3 and 5, energy absorbing elements 50-50' are disposed substantially symmetrically beneath seat member 12 at the lateral periphery of frame portion 30. Energy absorbing elements 50-50' are attached rearwardly to fasteners 26 and extend forwardly to attach at the lateral periphery of a forward portion of frame portion 30. Attachment of energy absorbing elements 50-50' fasteners 26-26' is pivotal, and is in substantially the same manner as is the attachment at the frame of energy absorbing elements 48-48'. Fastener 26 includes a stud fitting 70 on which is mounted a clevis 72. Energy absorbing elements 50-50' include a fitting 74 pivotally engaged with a clevis 72. A peripheral fitting 78 extends from clevis 74 and engages a pin 79 in a clevis 80; a cable 51b is attached to clevis 80. Cable 51b is attached at its other end in a similar manner at the frame 30 and at the rearward end of the lateral portion thereof. The pair of cables 51b-51b' is disposed substantially symmetrically at the rear of seat 10 to provide stiffening thereto in conjunction with cable 51a. As fully described in the above-referred U.S. Pat. No. 3,301,351 energy absorbers 48-48' and 50-50' comprise pairs of members, one telescoped within the other, engaged with plastically deformable members to be movable extensibly and compressibly to absorb and dissipate energy.

As best seen in FIGS. 2 and 6, webs 16-16' are wound around and attached to the rotary energy absorber means 20-20'. Energy absorber 20 is pivotably attached to fitting 22 which, in turn, is attached to the overhead 24 of the craft. Energy absorber 20 includes a snubber 90 with which the line 18 is frictionally engaged. Webs 16 are wound about the snubber 90 and a drum 92 of the energy absorber 20 and from there extend downwardly to be attached to the seat frame 30. As fully described in U.S. Pat. No. 3,369,634, energy absorber 20 comprises a drum 92 rotatable against internally disposed plastically deformable members to absorb and dissipate energy upon rotation of drum 92.

Figure 9:
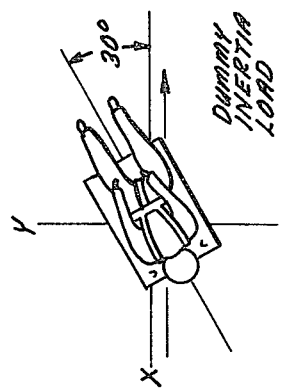
FIG. 7-9, inclusive, comprise schematic views of seat displacements under crash conditions.
Figure 8:
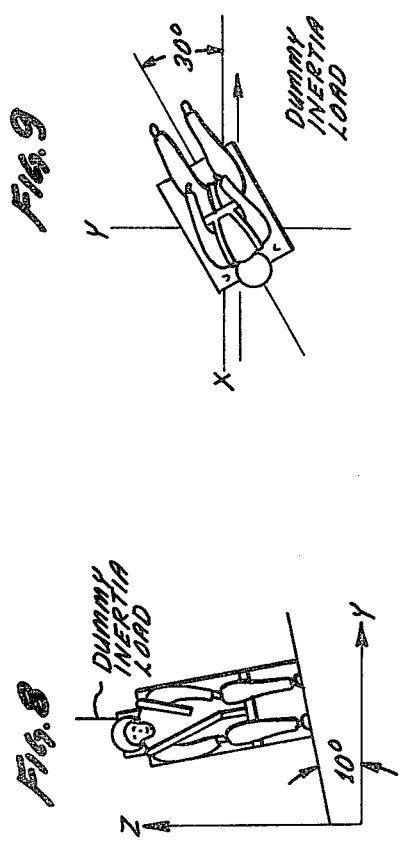
Figure 7:
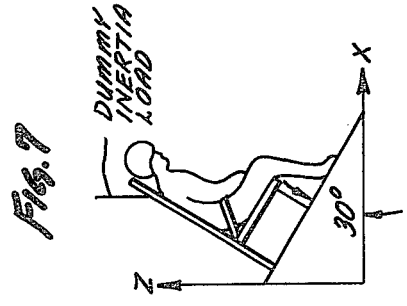

FIGS. 7–9 depict operation of a crashworthy seat in accordance with the invention under crash conditions. Upon the occurrence of a crash, the seat collapses in the direction of the crash. The rotary energy absorbers 22-22' unwind, and the seat moves forward and down as well as slightly laterally. The energy absorbers 48-48' and 50-50' compress and some of them elongate. The energy absorbers 48-48' and 50-50' and the rotary energy absorbers 20-20' are balanced with respect to one another for maximum safety of the occupant. Restraint for the forward pitching motion is provided by the energy absorption of energy absorbers 20-20', 48-48' and 50-50'. This motion is depicted in FIG. 7 as rotation in the Z-X plane where three-dimensional axes X-Y-Z are conventionally designated to symbolize three-dimensional situations. Sidewise rotation and translation, i. e., in the Z-Y plane, are restrained through the action of the energy absorbers 48-48' and 50-50' and the cables 51a-51a' and 51b-51b'.

Translation and rotation in the X-Y plane are restrained in similar fashion to such motion in the Z-Y plane. Thus, the motions of translation, roll and pitch for arbitrary crash angles are restrained through use of the invention, upon the occurrence of a crash.

Figure 10:
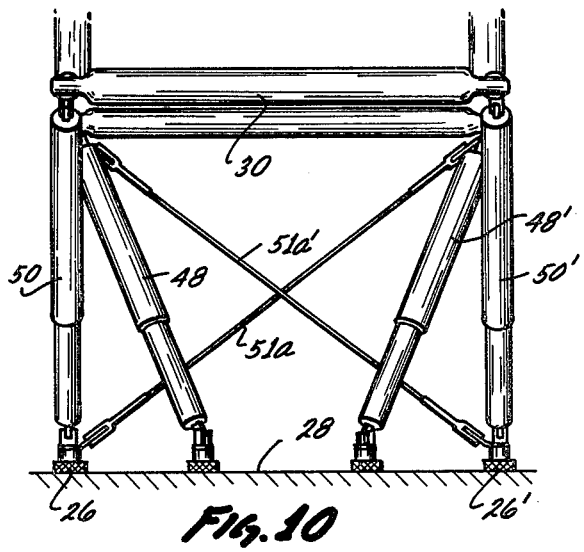
FIG. 10 is a partial view of a modified form of the invention showing a design optimized to accommodate to fore and aft forces.
Figure 11:
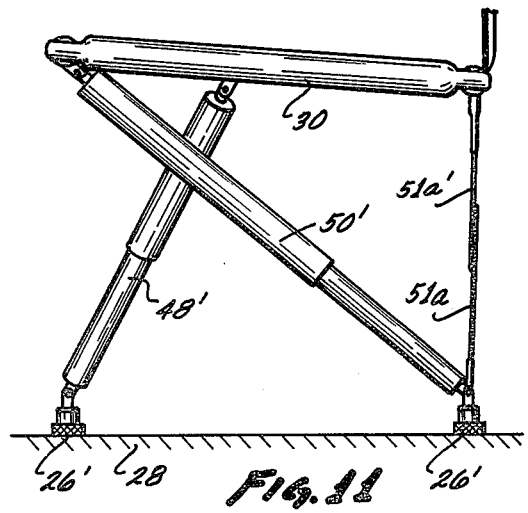
FIG. 11 is a side view of the form of the invention of FIG. 10.

FIGS. 10 and 11 are views of a modified form of the seat in which optimization of the restraints on the seat have been realized to reduce loadings on the linear and rotary energy absorbers or dissipaters and further to simplify the construction by reducing the number of cables. In FIGS. 10 and 11, parts which correspond to parts in the previous embodiment are identified by the same reference characters. In FIGS. 10 and 11 the linear energy absorbers 50 and 50' are in the same position as in the previous embodiment. Linear absorbers 48 and 48', however, are in a different position. The bottom ends of these absorbers are at the front of the seat and they are inclined forwardly and joined to the side edges of the seat as may be seen. There is only one pair of cables 51a-51a' which form an X lying in the plane at the back of the seat rather than there being two pairs of cables as in the previous embodiment. The securements to the floor are like the previous embodiment.

This optimized design primarily accommodates fore and aft forces acting on the seat. There is some accommodation for lateral forces but not as much as in the previous embodiment. The embodiment of FIGS. 10 and 11 is simpler and is more economical, utilizing a fewer number of parts. The forces of the linear and rotary energy absorbers are optimized.

Figure 12:
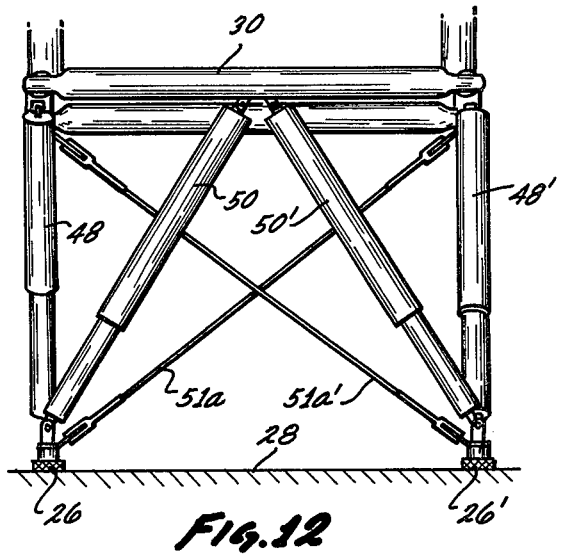
FIG. 12 is a partial front view of a modified form of the invention adapted as a side facing seat.
Figure 13:
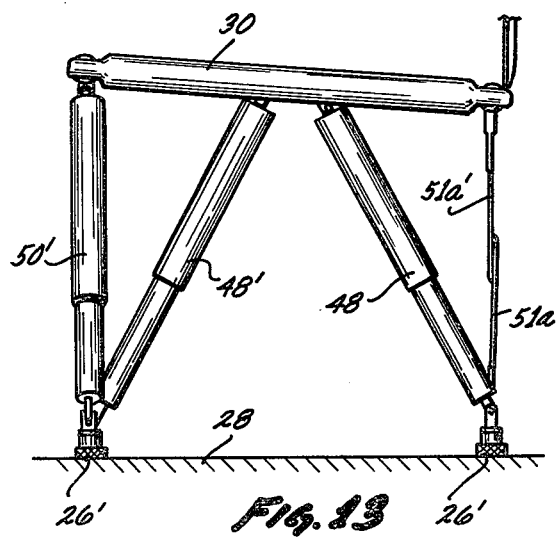
FIG. 13 is a side view of the form of the invention of FIG. 12.

FIGS. 12 and 13 of the drawings show a design of the seat which is particularly adapted as a sideward facing seat such as, for example, a gunners seat in an aircraft. The design of these figures is one calculated to adapt the configuration for this type of utilization. In FIGS. 12 and 13 the linear energy absorbers 50 and 50' are in a different position than the linear absorbers 50 and 50' of the previous embodiment. It is to be noted that the absorbers 50 and 50' at the front of the seat are angled inwardly as can be seen in FIG. 12. The other pair of linear absorbers identified by the characters 48 and 48' are at angles that are opposite to each other as shown. Both of these absorbers are angled inwardly. They slant inwardly towards each other as may be seen in FIG. 13. The absorber 48' at one side of the chair is secured at a lower corner at the front of the chair and the other absorber 48 is secured at a lower corner at the back of the chair and angles inwardly.

By this arrangement of the energy absorbers it is possible to eliminate one pair of cables, there being just one pair 51a-51a' in FIGS. 12 and 13 that forms an X at the back of the chair. The securements of the absorbers and the cables to the chair frame and to the floor are the same as in previous embodiments.

A cable of course operates only in tension. In FIGS. 12 and 13 it is possible to substitute a single linear absorber for a pair of cables forming an X and operating in tension.

Figure 14:
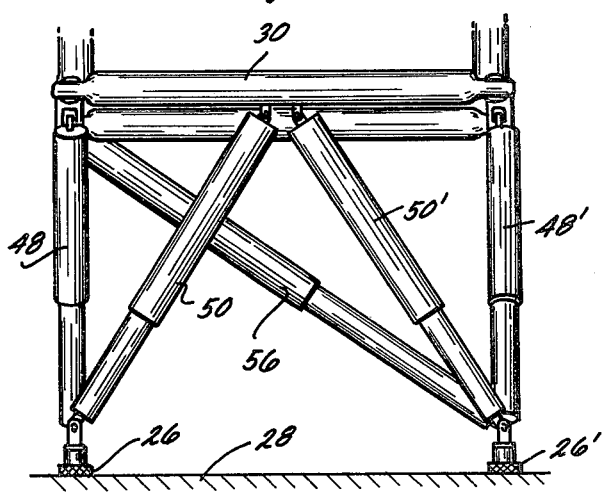
FIG. 14 is a front view of another form of the invention adapted as a sideward facing seat with optimized configuration.
Figure 15:
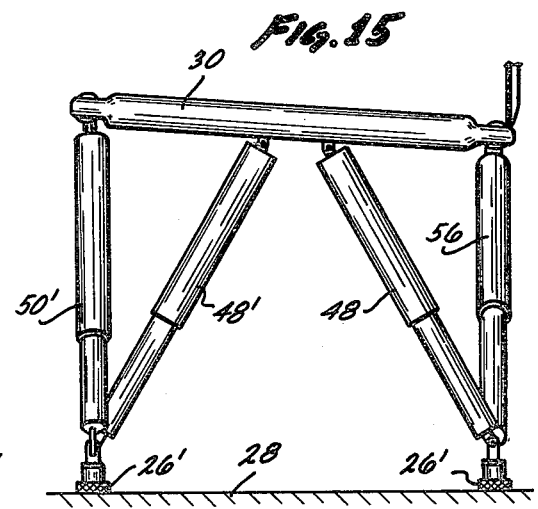
FIG. 15 is a side view of the form of the invention of FIG. 14.

FIGS. 14 and 15 are a further variation of the modification of the invention shown in FIGS. 12 and 13 which optimizes the design for side facing utilization. In this variation there is shown a fifth linear absorber that is in a position as may be seen in FIGS. 14 and 15 such that it substitutes for the single pair of tension cables of FIGS. 12 and 13. The linear absorber 56 is at an angle at the back of the chair from a bottom corner at the foot of one leg to another corner of the seat. As previously indicated the securements of the energy absorbers in the modified forms of the invention is like that of the first modification.

From the foregoing, those skilled in the art will understand the nature and construction of the invention and the matter in which it achieves and realizes the objects as set forth in the foregoing. The invention is adaptable to vehicle seats facing either fore and aft or to sideward facing seats such as an aircraft gunnery seat and particular configurations are disclosed which optimize the design for each utilization.

The foregoing disclosure is representative of preferred forms of the invention and is to be interpreted in an illustrative rather than in a limiting sense, the invention to be accorded the full scope of the claims appended hereto.

What is claimed is:

1. A crashworthy seat for use in vehicles having an overhead and a floor comprising:
    a seat bucket member;
    suspending means attached between the overhead of the vehicle and the seat bucket member, only for suspending said seat bucket member from the overhead of the vehicle;
    rotary energy absorbing means, only for absorbing crash-induced energy, attached between said suspension means and the overhead of the vehicle, said rotary energy absorbing means including at least one pair of spaced-apart drum members, and a plurality of working elements disposed between and in frictional engagement with said at least one pair of drum members, said working elements being plastically deformable upon rotation of one of said drum members relative to the other drum member and to absorb energy thereby, said plurality of working elements having the capability of repeated use for energy absorption, said suspension means being wound in frictional engagement about one of said drum members such that upon crash-induced motion of said suspension means, said drum member will rotate relative to the other drum member, said working elements absorbing energy thereby;
    a first pair of energy absorbing means attached between the rear of said seat bucket member and extending forwardly to attach to the floor of said vehicle, the first pair of energy absorbing means being capable of absorbing energy in both tension and compression; and
    at least one pair of second energy absorbing means capable of absorbing energy in both tension and compression and attached between a forward portion of the seat bucket member and the floor of said vehicle, said second energy absorbing means extending diagonally fore and aft between said forward portion of said seat bucket member and said floor of said vehicle such that they are disposed inwardly of said first pair of energy absorbing means.

2. A seat as defined in claim 1 wherein said second pair of energy absorbing means between said seat bucket member and the floor of said vehicle slope in a fore and aft direction opposite to the fore and aft slope of said first pair of energy absorbing means.

3. The invention as set forth in claim 1 wherein said suspension means comprises a pair of webs, said webs being wound in frictional engagement about said one drum member.

4. The invention as set forth in claim 1 further including stiffener means attached between the seat bucket member and the floor of the vehicle to provide lateral stiffening for the seat.

* * * * *

UNITED STATES PATENT AND TRADEMARK OFFICE
CERTIFICATE OF CORRECTION

PATENT NO. : 4,474,347
DATED : October 2, 1984
INVENTOR(S) : Bernard Mazelsky

It is certified that error appears in the above-identified patent and that said Letters Patent are hereby corrected as shown below:

Title page, Item [75] should read -- BERNARD MAZELSKY --.

Signed and Sealed this

Fifth Day of March 1985

[SEAL]

Attest:

DONALD J. QUIGG

Attesting Officer     Acting Commissioner of Patents and Trademarks